(12) United States Patent
Patten

(10) Patent No.: US 10,323,353 B2
(45) Date of Patent: Jun. 18, 2019

(54) FAIRED TETHER SYSTEMS WITH INTERNAL SUPPORT STRUCTURE IN THE FAIRED TETHER

(71) Applicant: Makani Technologies LLC, Alameda, CA (US)

(72) Inventor: Elias Wolfgang Patten, Seattle, WA (US)

(73) Assignee: Makani Technologies LLC, Alameda, CA (US)

( * ) Notice: Subject to any disclaimer, the term of this patent is extended or adjusted under 35 U.S.C. 154(b) by 0 days.

(21) Appl. No.: 16/136,569

(22) Filed: Sep. 20, 2018

(65) Prior Publication Data

US 2019/0100874 A1    Apr. 4, 2019

Related U.S. Application Data

(60) Provisional application No. 62/567,468, filed on Oct. 3, 2017.

(51) Int. Cl.
| | |
|---|---|
| *D07B 5/00* | (2006.01) |
| *D07B 1/04* | (2006.01) |
| *D07B 1/00* | (2006.01) |
| *F03D 5/00* | (2006.01) |

(52) U.S. Cl.
CPC ............. *D07B 5/005* (2013.01); *D07B 1/005* (2013.01); *D07B 1/04* (2013.01); *F03D 5/00* (2013.01); *D07B 2501/2076* (2013.01); *F05B 2240/917* (2013.01); *F05B 2240/921* (2013.01); *F05B 2240/923* (2013.01); *F05B 2250/72* (2013.01); *F05B 2280/5007* (2013.01)

(58) Field of Classification Search
CPC .......... D07B 5/005; D07B 1/005; D07B 1/04; F03D 5/00
USPC ..................................... 174/102 R
See application file for complete search history.

(56) References Cited

U.S. PATENT DOCUMENTS

| | | | | |
|---|---|---|---|---|
| 5,214,244 A | * | 5/1993 | Cummings | ............ H01B 7/145 114/243 |
| 9,230,714 B2 | * | 1/2016 | Vander Lind | ............. F03D 5/00 |
| 2015/0266546 A1 | * | 9/2015 | Petersen | ................. B63B 21/04 248/49 |

* cited by examiner

*Primary Examiner* — Timothy J Thompson
*Assistant Examiner* — Charles Pizzuto
(74) *Attorney, Agent, or Firm* — McDonnell Boehnen Hulbert & Berghoff LLP

(57) ABSTRACT

Faired tethers with internal support structures providing support to strength cores, and systems therewith, are described. The faired tethers include one or more electrical conductors and one or more rigid supports that inhibit movement of a strength core within a faired tether.

20 Claims, 11 Drawing Sheets

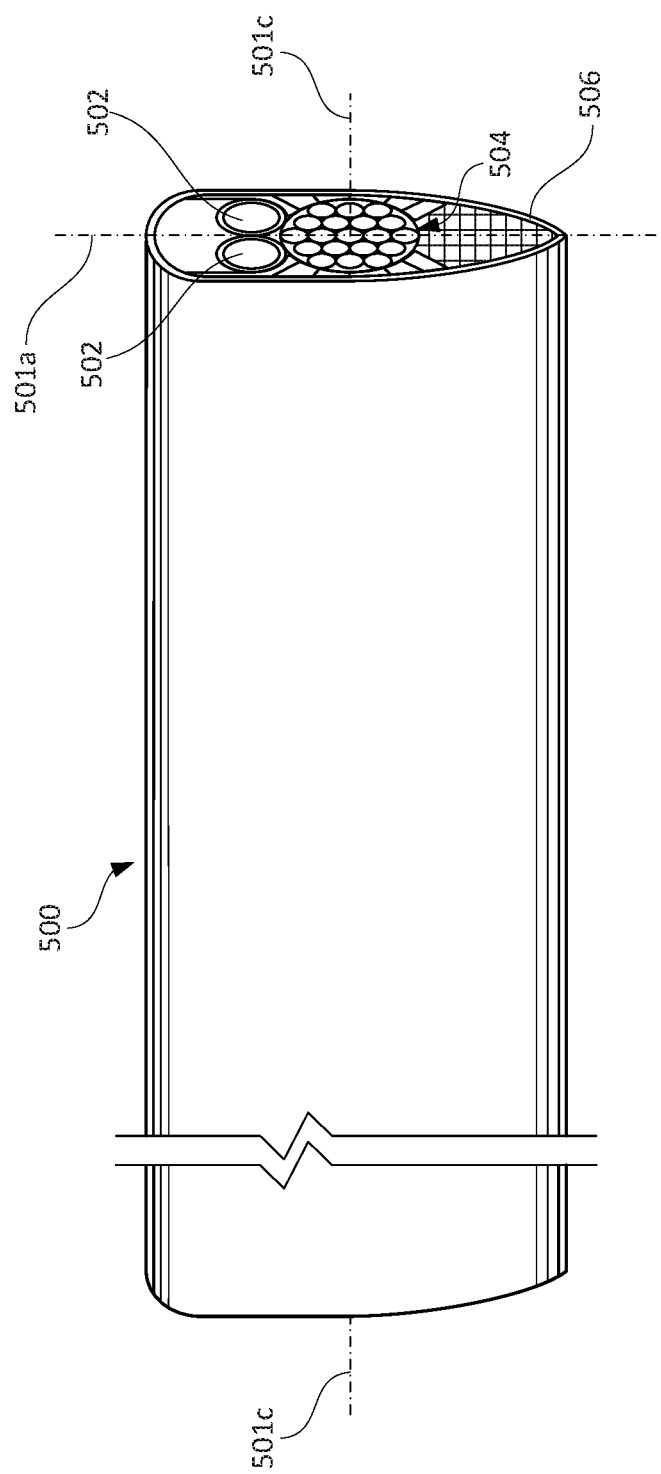

FAIRED TETHER SYSTEMS WITH INTERNAL SUPPORT STRUCTURE IN THE FAIRED TETHER

CROSS-REFERENCE TO RELATED APPLICATION

This application claims priority to U.S. Patent Application No. 62/567,468, filed Oct. 3, 2017, which is hereby incorporated by reference in its entirety.

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Systems of faired tethers with a strength core and internal support structures are described herein.

In one aspect, a tether may include an outer jacket formed with a compliant material and an exterior surface in the form of an airfoil shape. The airfoil shape includes a leading edge, a trailing edge, and opposing upper and lower side walls between the leading edge and the trailing edge. The tether may further include a strength core arranged longitudinally within the tether, a first electrical conductor arranged longitudinally within the tether and located between the strength core and the leading edge, and a first rigid support member disposed between the strength core and the lower side wall of the outer jacket, wherein the first rigid support member comprises a rigid material with a hardness greater than a hardness of the compliant material of the outer jacket.

In another aspect, a system may provide an aerial vehicle, a winch drum, and a tether configured to be wound around the winch drum. The tether may include an outer jacket formed with a compliant material and an exterior surface in the form of an airfoil shape. The airfoil shape may include a leading edge, a trailing edge, and opposing upper and lower side walls between the leading edge and the trailing edge. The system may be configured such that the lower side wall contacts the winch drum when the tether is wound around the winch drum. The tether may further include a strength core arranged longitudinally within the tether, a first electrical conductor arranged longitudinally within the tether and located between the strength core and the leading edge, and a first rigid support member disposed between the strength core and the lower side wall of the outer jacket. The first rigid support member may include a rigid material with a hardness greater than a hardness of the compliant material of the outer jacket. The system may be configured for the tether to be wrapped around the winch drum in a single layer only.

In another aspect, a system may provide an aerial vehicle, a winch drum, and a tether configured to be wound around the winch. The tether may include an outer jacket formed with a compliant material and an exterior surface in the form of an airfoil shape, including a leading edge, a trailing edge, and opposing upper and lower side walls between the leading edge and the trailing edge. The system may be configured such that the lower side wall contacts the winch drum when the tether is wound around the winch drum in a first layer, and wherein the lower side wall of a second layer contacts the upper side wall of the first layer when the tether is wound around the winch drum in a second layer. The tether may also include a strength core arranged longitudinally within the tether, a first electrical conductor arranged longitudinally within the tether and located between the strength core and the leading edge, a first rigid support member disposed between the strength core and the lower side wall of the outer jacket, wherein the first rigid support member comprises a rigid material with a hardness greater than a hardness of the compliant material of the outer jacket, and a second rigid support member disposed between the strength core and the upper side wall of the outer jacket, wherein the second rigid support member comprises a second rigid material with a hardness greater than the hardness of the compliant material of the outer jacket.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 5A depicts a faired tether, according to an example embodiment.

DETAILED DESCRIPTION

Figure 1:
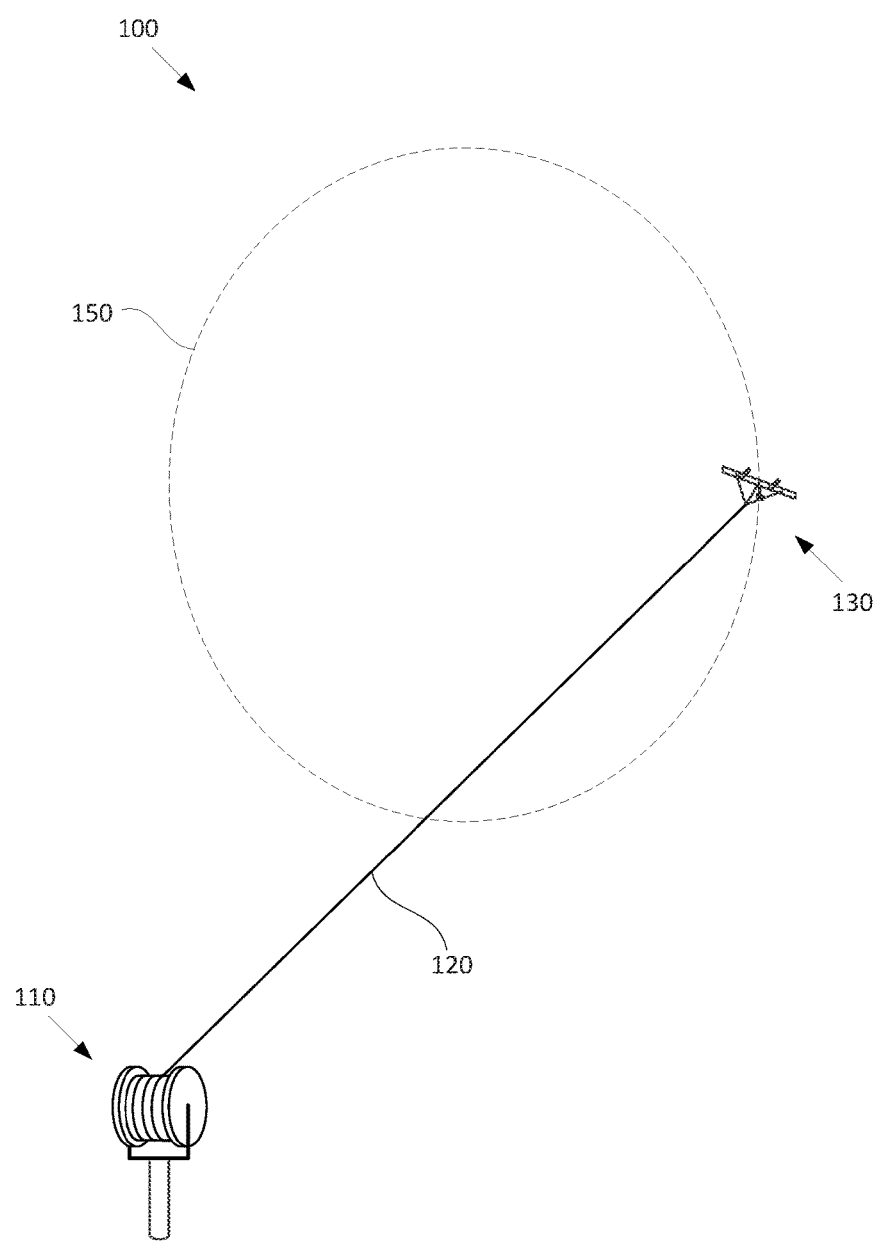
FIG. 1 depicts an Airborne Wind Turbine (AWT), according to an example embodiment.

Exemplary systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems can be arranged and combined in a wide variety of different configurations, all of which are contemplated herein.

I. Overview

Illustrative embodiments relate to components which may be used in a wind energy system, such as an Airborne Wind Turbine (AWT). In particular, illustrative embodiments may relate to or take the form of faired tethers with tail span sections that may be used in AWTs.

An AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. In some implementations, the ground station may transmit electricity to the aerial vehicle for take-off and/or landing.

In an AWT, an aerial vehicle may rest in and/or on a ground station (or a separate perch) when the wind is not conducive to power generation. When the wind is conducive to power generation, such as when a wind speed may be 3.5 meters per second (m/s) at an altitude of 200 meters, the ground station may deploy (or launch) the aerial vehicle. In addition, when the aerial vehicle is deployed and the wind is not conducive to power generation, the aerial vehicle may return to the ground station.

The aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

A tether may be utilized to connect the aerial vehicle to the ground station. Embodiments described herein relate specifically to faired tethers, which may be used as tethers in an AWT or for other applications (e.g., towed sensor array cables, ROV tethers, undersea umbilicals, etc.). The faired tethers may be configured to be wound onto, and unwound from, a winch drum, as well as withstanding tension forces when the aerial vehicle is in flight, and additionally configured to transmit signals and/or electricity between the aerial vehicle and the ground station.

In the faired tethers disclosed herein, strength members (e.g., carbon fiber rods, aramid fibers, PBO fibers, UHM-WPE fibers, etc.) within the tether form a strength core that allow the tethers to operate at high strains levels. In conventional tethers with a strength core, the strength core is subject to fatigue and eventual failure when pulled against a winch drum or sheave in tension and coiled on and off repeatedly. In conventional systems, a grooved winch drum surface (e.g., a series of concave radiuses along the drum surface) may be used to provide support along an extended outer periphery of a round tether, thereby providing improved fatigue resistance for internal strength members. Faired tethers present unique challenges, including expensive grooving configurations, limitations to single layer stacking in some design cases, and enlarged internal volumes in the tether in which a strength core may move and experience fatigue and/or friction wear.

The faired tethers disclosed herein provide one or more internal rigid structures to support the strength core and limit translation of the strength core within the inside of the faired tether, including limiting excursion of the strength core into an outer jacket of the faired tether. Additionally, the internal rigid supports may allow multi-layer stacking of the faired tethers without deformation of the tether body or additional translation of the strength core within the body of the tether.

The internal rigid supports may be a solid material or a ribbed structure to minimize weight. The rigid supports may be on one side only of the faired tether, or on both sides, depending on whether one or both sides of the faired tether may wrapped onto a winch drum, or if the wraps will be single layer or multi-layer. The rigid support may rotate about the core (to allow the fairing to rotate relative to the core), or be fixed relative to the strength core. The rigid supports may be, for example, an extruded plastic, and/or a plastic with filler or fiber for extra strength, or a high temperature resistant material so it can remain stiff and support the core when hot. Additional examples of rigid support material include fiber reinforced plastic, a composite pultrusion, or plastic extruded around metallic or other rib structure/material.

II. Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at three locations on the aerial vehicle 130. However, in other examples, the tether 120 may be attached at one or more locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the aerial vehicle 130 is possible. Further, the ground station 110 may be further configured to receive the aerial vehicle 130 during a landing. The ground station 110 may be formed of any material or materials that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a deployed length of the tether 120. For example, when the aerial vehicle 130 is deployed, the one or more components may be configured to pay out and/or reel in the tether 120. In some implementations, the one or more components may be configured to pay out and/or reel in the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electrical energy to the aerial vehicle 130 in order to power the aerial vehicle 130 for takeoff, landing, hover flight, and/or forward flight. The tether 120 may use materials that may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a strength core configured to withstand one or more forces of the aerial vehicle 130 when the aerial vehicle 130 is in hover flight, forward flight, and/or crosswind flight. In one example, the tether 120 may have a length of 100 meters or more.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of metal, plastic and/or other polymers. The aerial vehicle 130 may be formed of materials that allow for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150.

B. Illustrative Components of an AWT

Figure 2:
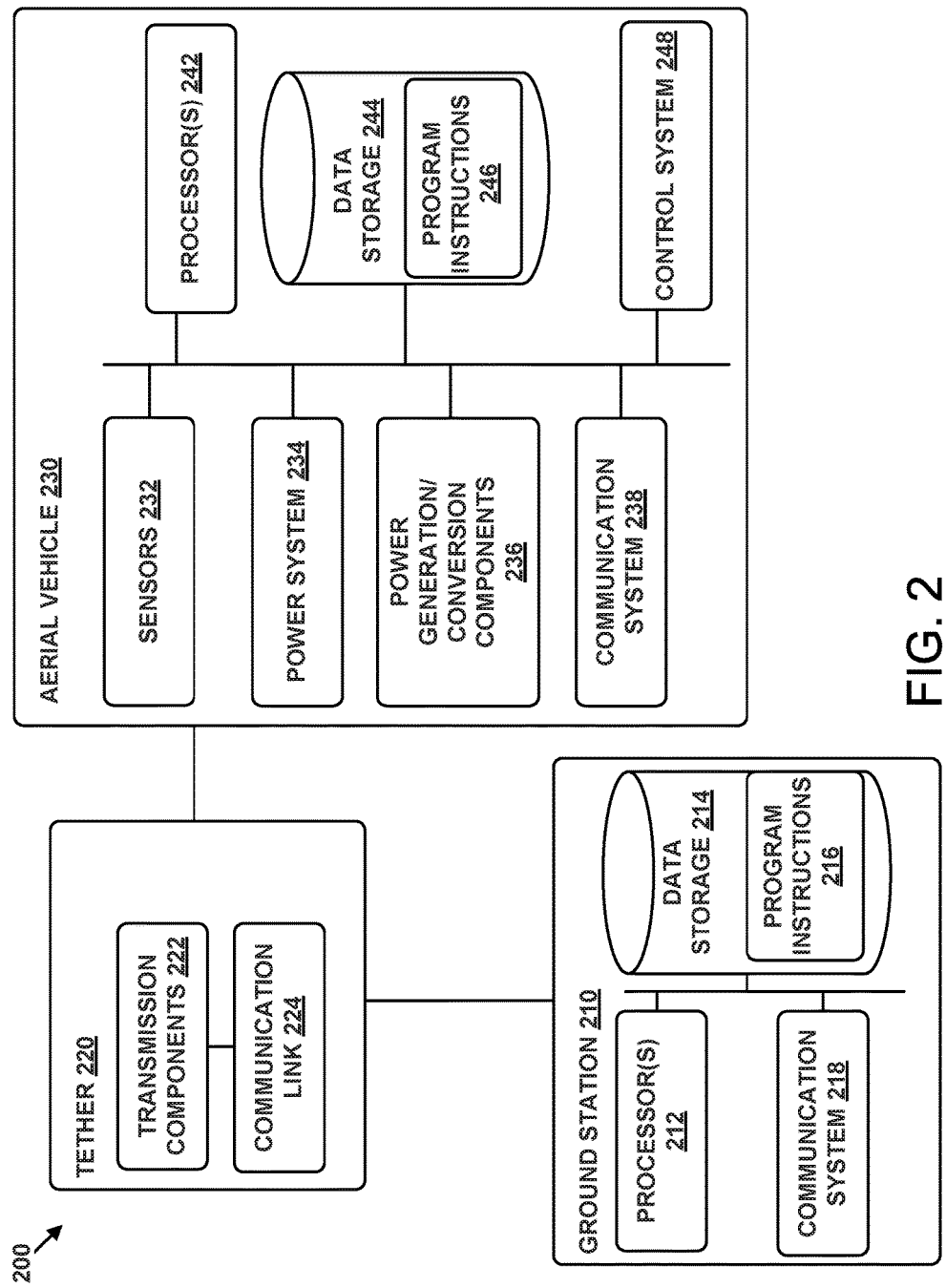
FIG. 2 is a simplified block diagram illustrating components of an AWT, according to an example embodiment.

FIG. 2 is a simplified block diagram illustrating components of an AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link

224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more electrical conductors that are configured to transmit electricity. And in at least one such example, the one or more electrical conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able to mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
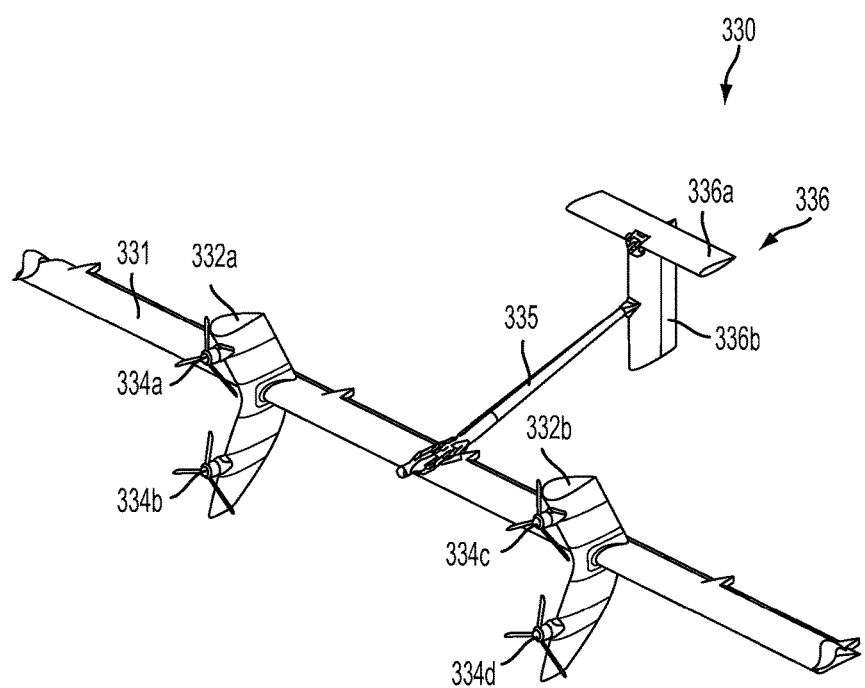
FIG. 3 depicts an aerial vehicle of an AWT, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332a, 332b, rotors 334a, 334b, 334c, 334d, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332a, 332b may be any suitable material for the aerial vehicle 330 to engage in hover flight, forward flight, and/or crosswind flight. For example, the main wing 331 and pylons 332a, 332b may include carbon fiber and/or e-glass, and include internal supporting spars or other structures. Moreover, the main wing 331 and pylons 332a, 332b may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332a, 332b may connect the rotors 334a, 334b, 334c, and 334d to the main wing 331. In some examples, the pylons 332a, 332b may take the form of, or be similar in form to, a lifting body airfoil (e.g., a wing). In some examples, a vertical spacing between corresponding rotors (e.g., rotor 334a and rotor 334b on pylon 332a) may be 0.9 meters.

The rotors 334a, 334b, 334c, and 334d may be configured to drive one or more generators for the purpose of generating electrical energy. In this example, the rotors 334a, 334b, 334c, and 334d may each include one or more blades, such as three blades or four blades. The rotor blades may rotate via interactions with the wind and be used to drive the one or more generators. In addition, the rotors 334a, 334b, 334c, and 334d may also be configured to provide thrust to the aerial vehicle 330 during flight. With this arrangement, the rotors 334a, 334b, 334c, and 334d may function as one or more propulsion units, such as a propeller. Although the rotors 334a, 334b, 334c, and 334d are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336a and a vertical stabilizer 336b. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336a and/or the vertical stabilizer 336b may be used to stabilize the aerial vehicle 330 and/or reduce drag on the aerial vehicle 330 during hover flight, forward flight, and/or crosswind flight. For example, the tail wing 336a and/or the vertical stabilizer 336b may be used to maintain a pitch of the aerial vehicle 330 during hover flight, forward flight, and/or crosswind flight. The tail wing 336a and the vertical stabilizer 336b may have a variety of dimensions. For example, the tail wing 336a may have a length of 2 meters. Moreover, in some examples, the tail wing 336a may have a surface area of 0.45 meters squared. Further, in some examples, the tail wing 336a may be located 1 meter above a center of mass of the aerial vehicle 330.

While the aerial vehicle 330 has been described above, it should be understood that the systems described herein could involve any suitable aerial vehicle that is connected to an airborne wind turbine tether, such as the tether 120 and/or the tether 220.

D. Aerial Vehicle Coupled to a Ground Station via a Tether

Figure 4:
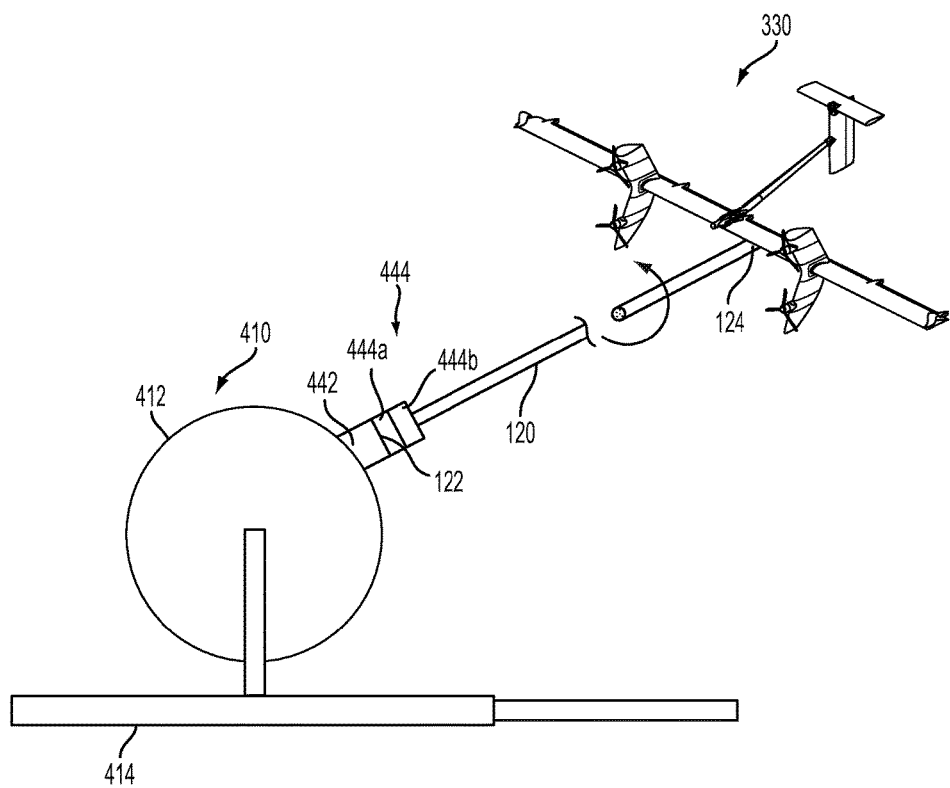
FIG. 4 depicts an aerial vehicle coupled to a ground station via a tether, according to an example embodiment.

FIG. 4 depicts the aerial vehicle 330 coupled to a ground station 410 via the tether 120, according to an example embodiment. Referring to FIG. 4, the ground station 410 may include a winch drum 412 and a platform 414. The ground station 110 and/or the ground station 210 may take the form of or be similar in form to the ground station 410. FIG. 4 is for illustrative purposes only and may not reflect all components or connections.

As shown in FIG. 4, the tether 120 may be coupled to a tether gimbal assembly 442 at a proximate tether end 122 and to the aerial vehicle 330 at a distal tether end 124. Additionally or alternatively, at least a portion of the tether 120 (e.g., at least one electrical conductor) may pass through the tether gimbal assembly 442. In some embodiments, the tether 120 may terminate at the tether gimbal assembly 442. Moreover, as shown in FIG. 4, the tether gimbal assembly 442 may also be coupled to the winch drum 412 which in turn may be coupled to the platform 414. In some embodiments, the tether gimbal assembly 442 may be configured to rotate about one or more axes, such as an altitude axis and an azimuth axis, in order to allow the proximate tether end 122 to move in those axes in response to movement of the aerial vehicle 330.

A rotational component 444 located between the tether 120 and the tether gimbal assembly 442 may allow the tether 120 to rotate about a long axis of the tether 120. The long axis is defined as extending between the proximate tether end 122 and the distal tether end 124. In some embodiments, at least a portion of the tether 120 may pass through the rotational component 444. Moreover, in some embodiments, the tether 120 may pass through the rotational component 444. Further, in some embodiments, the rotational component 444 may include a fixed portion 444a and a rotatable portion 444b, for example, in the form of one or more bearings and/or slip rings. The fixed portion 444a may be coupled to the tether gimbal assembly 442. The rotatable portion 444b may be coupled to the tether 120.

The use of the word fixed in the fixed portion 444a of the rotational component 444 is not intended to limit fixed portion 444a to a stationary configuration. In this example, the fixed portion 444a may move in axes described by the tether gimbal assembly 442 (e.g., altitude and azimuth), and may rotate about the ground station 410 as the winch drum 412 rotates, but the fixed portion 444a will not rotate about the tether 120, i.e., with respect to the long axis of the tether 120. Moreover, in this example, the rotatable portion 444b of the rotational component 444 may be coupled to the tether 120 and configured to substantially rotate with the rotation of tether 120.

Via the rotational component 444, the tether 120 may rotate about its centerline along the long axis as the aerial vehicle 330 orbits. The distal tether end 124 may rotate a different amount then the proximate tether end 122, resulting in an amount of twist along the length of the tether 420. With this arrangement, the amount of twist in the tether 420 may vary based on a number of parameters during crosswind flight of the aerial vehicle 330.

E. Illustrative Tethers

FIG. 5A depicts a faired tether 500, according to an example embodiment. The tether 120 and/or the tether 220 may take the form of or be similar in form to the tether 500. FIG. 5A and the remaining Figures depicting tethers and winch drums are for illustrative purposes only and may not reflect all components or connections. Further, as illustrations, the Figures may not reflect actual operating conditions, but are merely to illustrate aspects of embodiments described. For example, while a perfectly straight tether may be used to illustrate a described faired tether embodiment, during orbiting crosswind flight a faired tether employed as an aerial vehicle tether may in practice exhibit some level of droop between the ground station and the aerial vehicle. Further still, the relative dimensions in the Figures may not be to scale, but are merely to illustrate the embodiments described.

As depicted, tether 500 is illustrated as a faired tether, as described further with respect to Figures below. The faired tether 500 includes a strength core 504 running longitudinally (i.e., along the length of the faired tether 500) through the interior of the tether 500. The strength core 504 may provide a significant contribution to the tensile strength and/or shear strength of the tether 500. The strength core 504 may include strength members 504A (illustrated in FIG. 5B), which may take various forms in different embodiments. For example, in some embodiments, the strength core 504 may include pultruded fiber rod, carbon fiber rod (e.g., T700 or T800), dry strength fiber (e.g., poly p-phenylene-2, 6-benzoobisoxazole ("PBO")), fiberglass, one or more metals (e.g., aluminum), epoxy, and/or a combination of carbon fiber, fiberglass, and/or one or more metals. As one example, the strength core 504 may include a combination of fibers, such as a first carbon fiber having a first modulus and a second carbon fiber having a second modulus that is greater than the first modulus. As another example, the core 504 may include carbon fiber and fiberglass or epoxy. Further, the core 504 may include a matrix composite and/or carbon fiber and/or fiberglass, such as a metal matrix composite (e.g., aluminum matrix composite).

Figure 5B:
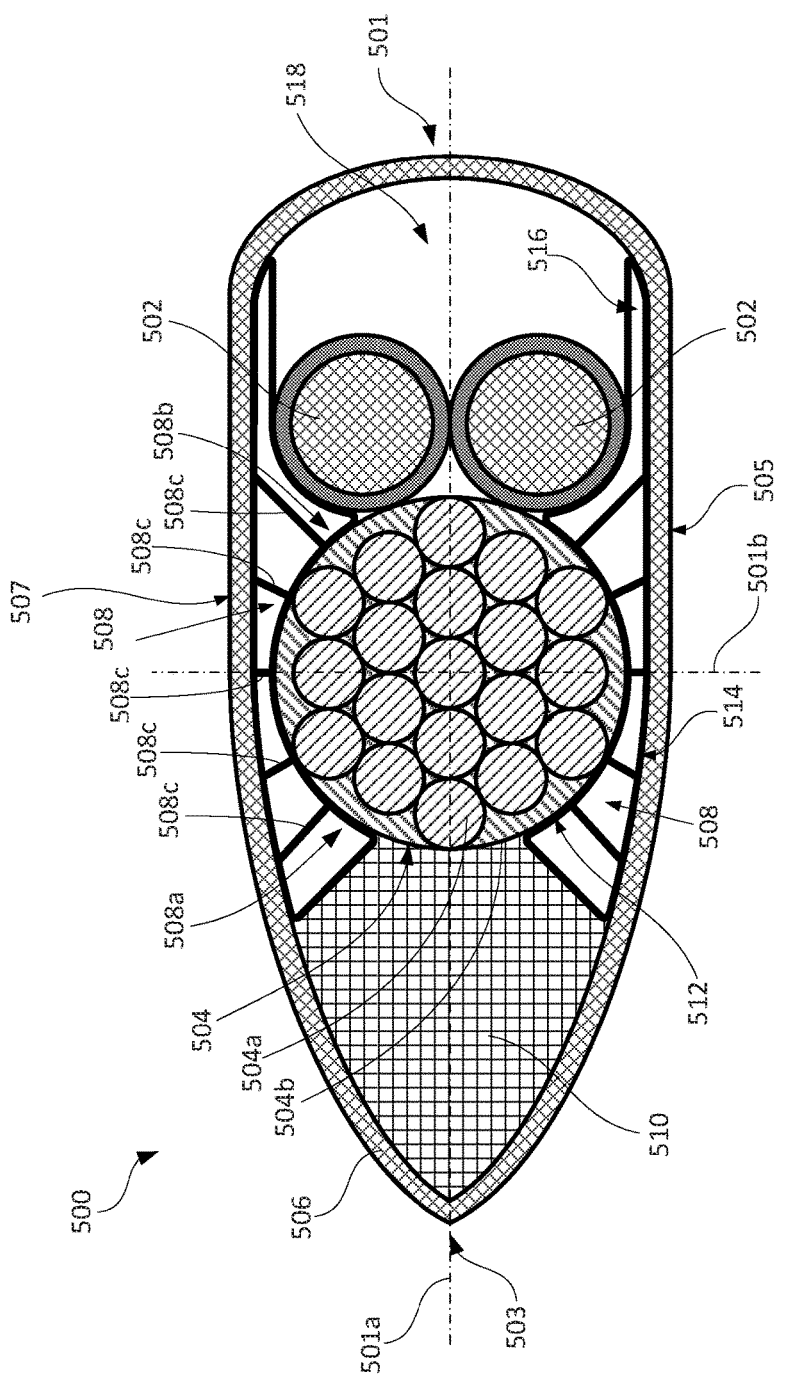
FIG. 5B depicts a cross-section view of the faired tether in FIG. 5A, according to an example embodiment.

A fill material 510 (as illustrated in FIG. 5B) in the faired tether 500 may be solid (e.g., a foam, vulcanizing rubber, or silicone), or in another embodiment the fill material 510 may take the form of a non-solid structure (e.g., ribs, or various fill materials and voids). The fill material 510 may be uniform or may be comprised of various materials.

The faired tether 500 includes an outer jacket 506 that encases the internal elements. The illustrated jacket 506 is in the form of an airfoil shape (see FIG. 5B for additional detail), with a leading edge and a trailing edge. As illustrated, the faired tether 500 is a symmetric airfoil shape, such as a symmetric 4-digit NACA airfoil. In another embodiment, the faired tether 500 may be a different shape, such a different symmetric airfoil or a cambered airfoil, such as a cambered 4-digit NACA airfoil. Additionally or alternatively, the airfoil shape of the faired tether 500 may change along the length of the faired tether 500. The airfoil shape may be integrally formed as part of the faired tether 500 or may be the result in whole or in part of the jacket or other external component. The outer jacket 506 is preferably a compliant material that can be maintain its shape to provide protection and aerodynamic capabilities while still deforming to allow the tether to be wound around a winch drum. Preferably, the outer jacket 506 measures in a range between about 30 and about 100 on the Shore durometer "A" scale.

The faired tether 500 includes a pair of electrical conductors 502. The electrical conductors 502 may be configured to transmit electrical power. For example, the electrical conductors 502 may be configured for high-voltage AC or DC power transmission (e.g., greater than 1,000 volts). As one example, the electrical conductors 502 may be configured to carry an AC or DC voltage of between 1 kilovolt and 5 kilovolts, or higher, and an associated power transmission current of between 50 amperes to 250 amperes.

Longitudinal axis 501c along a length of the tether 500 and transverse axis 501a along a chord line of the airfoil shape of the tether 500 are provided in FIG. 5A for reference.

FIG. 5B depicts a cross-section view of the faired tether in FIG. 5A, according to an example embodiment. The illustrated jacket 506 includes a leading edge 501, a trailing edge 503, a lower side wall 505, and an upper side wall 507.

The strength core 504 is illustrated as comprising multiple strength members 504A. This is an example embodiment only, and other configurations of strength core 504 are possible, including, but not limited to, a single strength member, different cross-sectional configurations, and different or no wraps or sleeves about the periphery of the strength core 504. Each electrical conductor 502 is illustrated as individually insulated single strand electrical conductors. Other configurations are possible as well. In another embodiment, the electrical conductors 502 may be insulated from each other, but with a single integral insulation form. Alternatively or additionally, each electrical conductor 502 may be formed as multiple strands and/or as a bundle of cables in which one or more cables are individually insulated from other cables in the respective electrical conductor.

FIG. 5B reflects an arrangement where the electrical conductors 502 are located in a cavity 518 between the leading edge 501 of the faired tether 500 and the strength core 504. In the embodiment depicted, the length of the cavity 518 along the axis 501a is greater than the diameters of the electrical conductors 502. Other arrangements are possible as well. For example, in another embodiment, a pair of electrical conductors may be stacked side-by-side instead of vertically (in the FIG. 5B view), and/or the cavity 518 may have a different configuration.

In the embodiment depicted in FIG. 5B, a rigid support 508 is located on either side of the strength core 504, with one between the strength core 504 and the upper side wall 507 and one between the strength core 504 and the lower side wall 505. Each of the rigid supports 508, as arranged, is arranged as a mirror image of the other. In FIG. 5B, any labeled element on either rigid support 508 is applicable and present on the opposing rigid support 508, even if not specifically labeled for illustrative clarity.

Preferably, the material comprising the rigid supports 508 is harder than the material comprising the jacket 506, and preferably in a range between about 10 and about 100 on the Shore durometer "D" scale, though higher hardness measures are possible. For example, the rigid supports 508 may comprise metal or other components which measure at the top or beyond the top of the Shore durometer "D" scale.

Each of the rigid supports 508 includes a mating surface 514 that conforms to the shape of the interior surface along the respective side wall 505 or 507. This helps distribute a load force between the respective side wall 505 or 507 and the strength core 504 over a large area of the respective side wall 505 or 507. Each of the rigid supports 508 further includes a concave surface 512 that mates with the strength core 504, conforming around a portion of the periphery of the strength core 504 by means of protrusions 508a and 508b. This configuration inhibits movement of the strength core 504 along the transverse axis 501a. Without one or both the rigid supports 508, as the tether 500 droops in flight or otherwise deforms from a true linear form along its longitudinal length, the strength core 504 may translate between positions within the interior of the tether 504.

The rigid supports 508 include an internal structure which inhibits movement of the strength core 504 within the tether 500 in the direction of the respective side walls 505 or 507 adjacent to the each rigid support 508. In the embodiment illustrated in FIG. 5B, the internal structure is a series of ribs 508c extending between the respective mating surface 514 and the respective concave surface 512. This configuration provides a strong and light means of support.

Each of the rigid supports 508 include a protrusion 516 that extends along the respective side wall 505 or 507 towards the leading edge 501. The protrusion 516 is disposed between the nearest electrical conductor 502 and the respective side wall 505 or 507. The protrusion 516 provides an extended length along which the rigid support 508 conforms to the respective side wall 505 or 507, and provides rigid support for the electrical conductor 502 which prevents or inhibits deformation and/or damage to the jacket 506.

The fill material 510 is optional and may be included to provide support to the airfoil form of the jacket 506. In the embodiment shown in FIG. 5B, the fill material 510 is preferably located adjacent to the trailing edge 503 and between the upper and lower side walls 507 and 505. Additionally, the fill material 514 may be provided to locate and secure the positions of the rigid supports 508. Preferably the fill material 510 has a hardness less than the rigid supports 508 and preferably between about 10 and about 100 as measured on the Shore durometer "OO" scale. Example materials for the fill material 510 include foam and silicone.

In one embodiment, the described elements of the tether 500 may be rotatable about the strength core 504. The strength core 504 may rotate during use of the tether as a result of how it is fixed to other components in the larger system, such as the ground station and the aerial vehicle. However, it may be desirable to have the airfoil shape of the jacket 506 rotate in relation to the incident wind and without regard to a rotational orientation of the strength core 504 in the system. In such a configuration, the rigid supports 508 may rotatably slip about the periphery of the strength core 504. In another embodiment, the rotational disposition of the described elements of the tether 500 may be fixed relative to the strength core 504.

Figure 6:
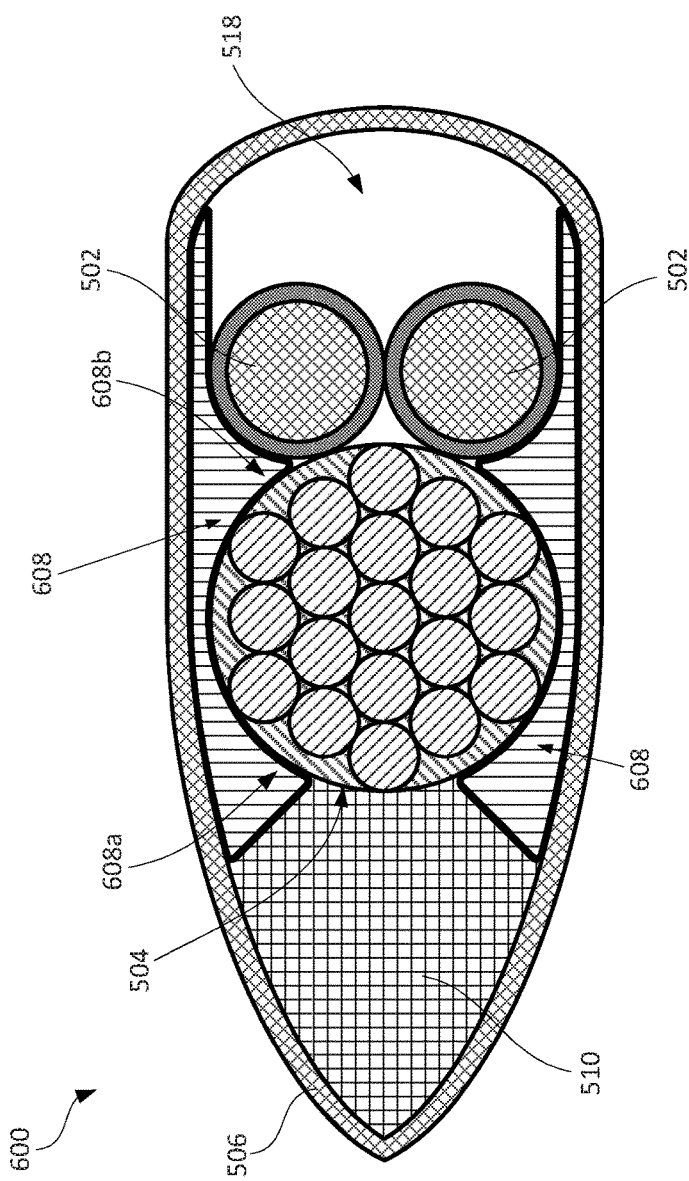
FIG. 6 depicts a cross-section view of a faired tether, according to an example embodiment.

FIG. 6 depicts a cross-section view of a faired tether 600, according to an example embodiment. Tether 600 is arranged similarly to tether 500 and has some similar or identical elements, including electrical conductors 502, strength core 504, outer jacket 506, fill material 510, and cavity 518. In this illustration, rigid supports 608 are shaped and arranged similarly to rigid supports 508, except that the rigid supports 608 are formed as a solid material. The rigid supports 608 function the same as described above with respect to rigid supports 508.

As depicted, the rigid supports 608 have a uniform material composition in the cross-section shown; however, other embodiments are also possible, including using a composite of different materials to create the solid rigid support 608. As with rigid supports 508, preferably, the material comprising the rigid supports 608 is harder than the material comprising the jacket 506, and preferably in a range between about 10 and about 100 on the Shore durometer "D" scale, though higher hardness measures are possible. For example, the rigid supports 608 may comprise metal or other components which measure at the top or beyond the top of the Shore durometer "D" scale. Preferably, the rigid supports 608 are also harder than the fill material 510, as discussed above.

Figure 7:
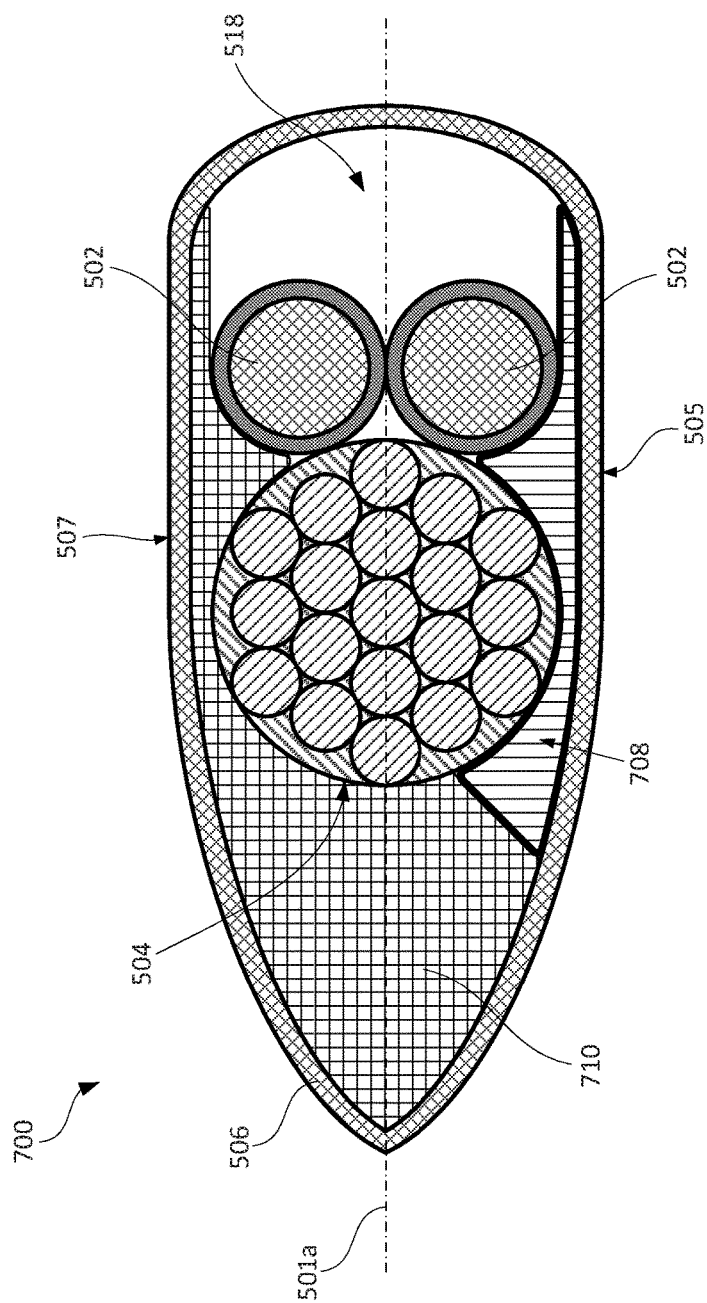
FIG. 7 depicts a cross-section view of a faired tether, according to an example embodiment.

FIG. 7 depicts a cross-section view of a faired tether 700, according to an example embodiment. Tether 700 is arranged similarly to tethers 500 and 600, and has some similar or identical elements, including electrical conductors 502, strength core 504, outer jacket 506, and cavity 518. In this embodiment, a rigid support 708, which may be the same or similar to rigid support 608 or 508, is arranged between the strength core 504 and the lower side wall 505. Rigid support 708 is depicted as a solid material similar to rigid support 608, but in another embodiment may instead be a ribbed structure similar to rigid support 508. There is no rigid support element between the strength core 604 and the upper side wall 507. Instead, in this embodiment, fill material 710 (or some other material) occupies the space between the strength core 504 and the upper side wall 507. The rigid support 708 functions similarly as described above with respect to rigid supports 508, and specifically the rigid support 708 inhibits internal translation of the strength core along the transverse axis 501a and towards the lower side wall 505. The rigid support 708 has similar or identical material, hardness properties, and relative hardness to other elements in tether 700 as described above with respect to rigid supports 508 and 608.

The embodiment in FIG. 7 has potentially greater flexibility and less weight than the similar embodiment in tether 600 with two rigid supports 608. This embodiment is best suited for systems in which the tether 700 is intended to be wrapped in a single layer on a winch drum and/or only contacts a winch drum surface on a dedicated (lower) side of the tether 700.

Figure 8:
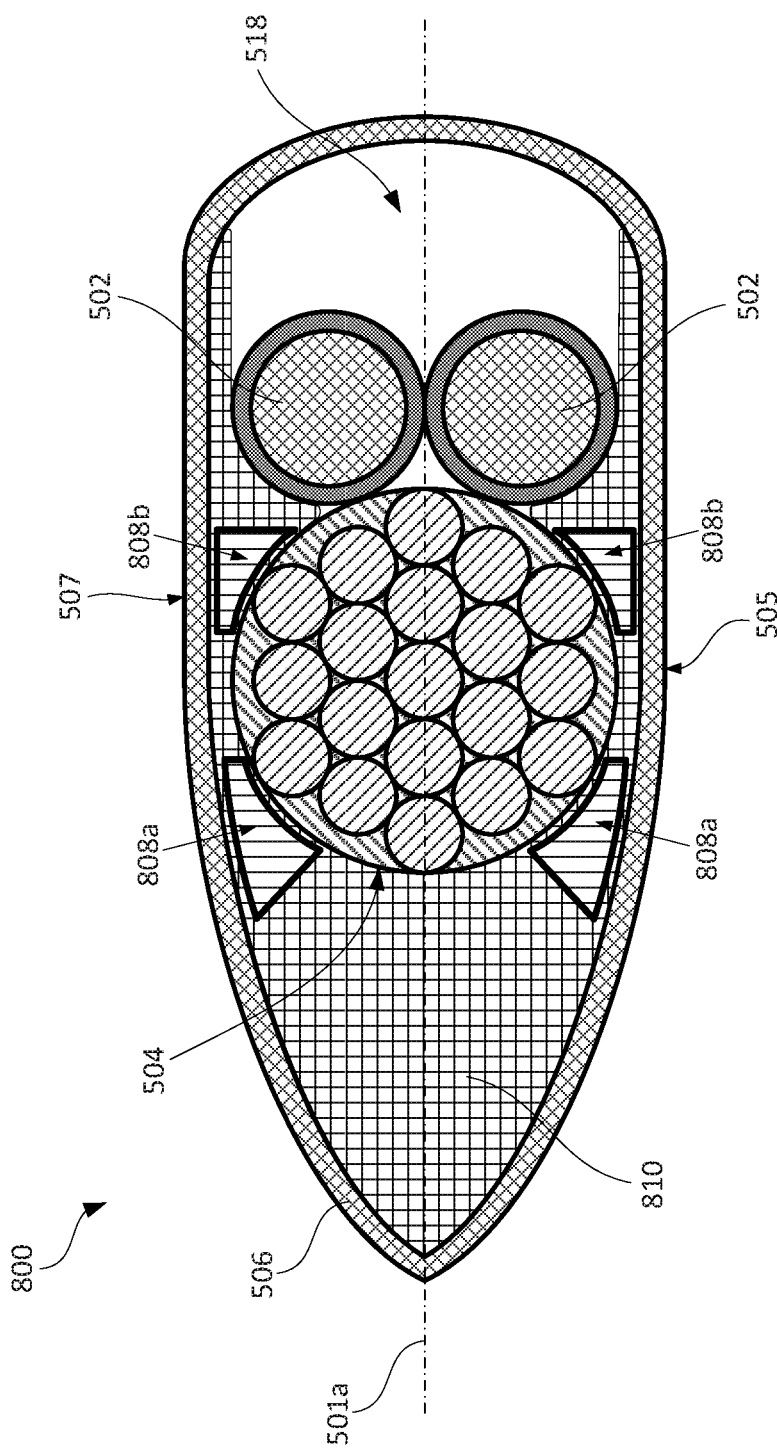
FIG. 8 depicts a cross-section view of a faired tether, according to an example embodiment.

FIG. 8 depicts a cross-section view of a faired tether 800, according to an example embodiment. Tether 800 is arranged similarly to tethers 500 and 600, and has some similar or identical elements, including electrical conductors 502, strength core 504, outer jacket 506, and cavity 518. In this embodiment, multiple rigid supports 808a and 808b are arranged about the strength core and between the strength core 504 and the lower and upper side walls 505 and 507. Rigid supports 808a and 808b may be formed similarly to, and comprise similar or identical materials as discussed above with respect to, rigid supports 508 and 608. Rigid supports 808a and 808b are depicted as solid materials similar to rigid support 608, but in another embodiment may instead be ribbed structure similar to rigid support 508, or in another embodiment may be a combination of ribbed or solid materials. In this embodiment, rigid supports 808a and 808b are shown as embedded in fill material 810, with fill material encapsulating each of the supports 808a and 808b. In another embodiment, one or more of the rigid supports 808a or 808b may be in direct contact with either, some, or all of a respective side wall 505 or 507, strength core 504, and an electrical conductor 502. Similarly, in other embodiments, the above disclosed rigid supports 508, 608, or 708 may also be partially or entirely encapsulated with a fill material.

The rigid supports 808a and 808b function similarly as described above with respect to rigid supports 508 and 608, and specifically the rigid supports 808a and 808b inhibit internal translation of the strength core 504 along the transverse axis 501a and towards the lower or upper side walls 505 and 507. The rigid supports 808a and 808b have similar or identical material, hardness properties, and relative hardness to other elements in tether 800 as described above with respect to rigid support 508 and 608.

Figure 9:
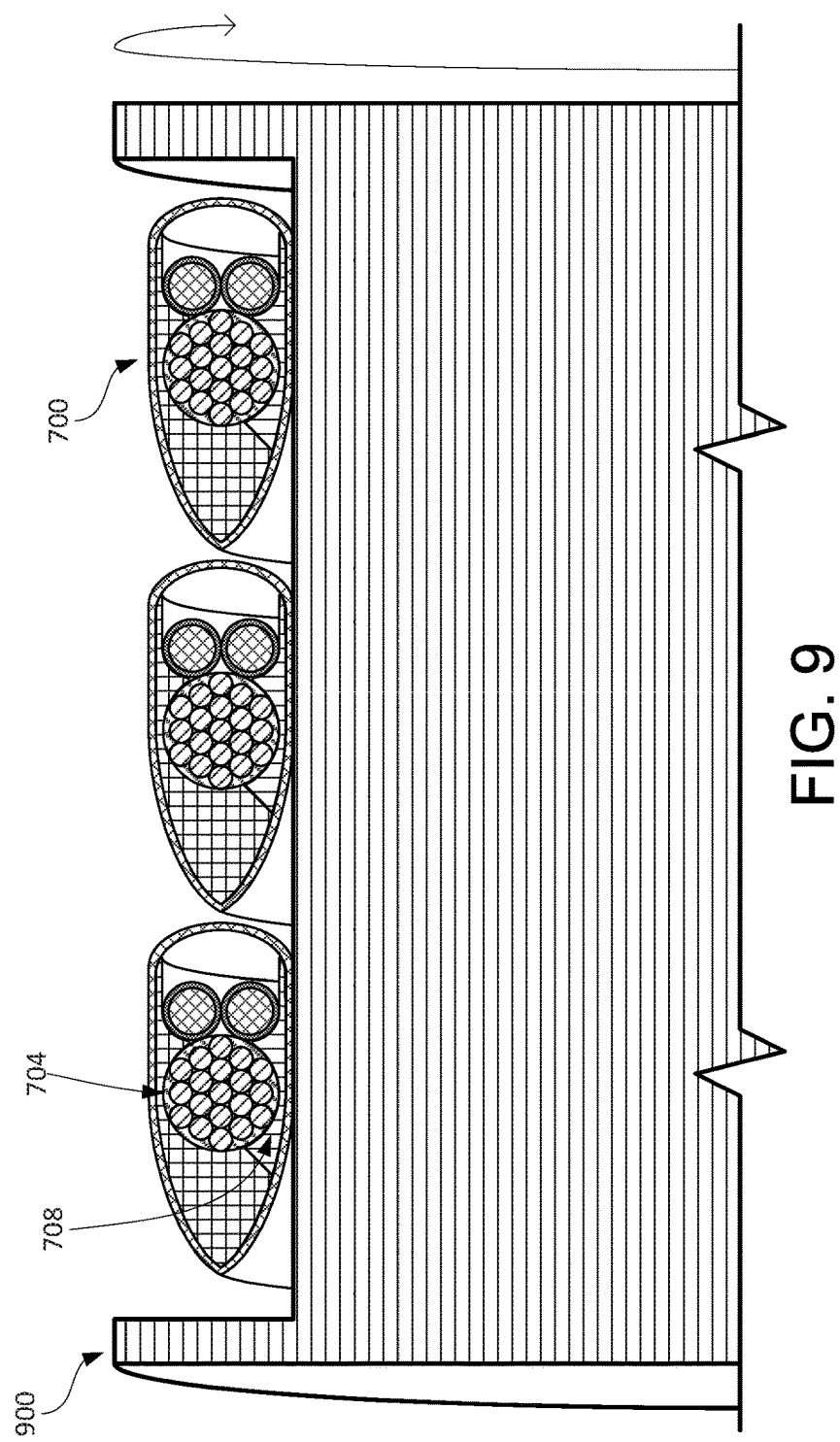
FIG. 9 depicts a section view of a faired tether wrapped in a single layer on a winch drum, according to an example embodiment.

FIG. 9 depicts a section view of the faired tether 700 wrapped in a single layer on a winch drum 900, according to an example embodiment. Winch drum 900 may be the same or similar to winch drum 412. In this arrangement, the single rigid support 708 is oriented towards the winch drum winding surface and provides support to the strength core 704 when the tether 700 is wrapped onto winch drum 900.

Figure 10:
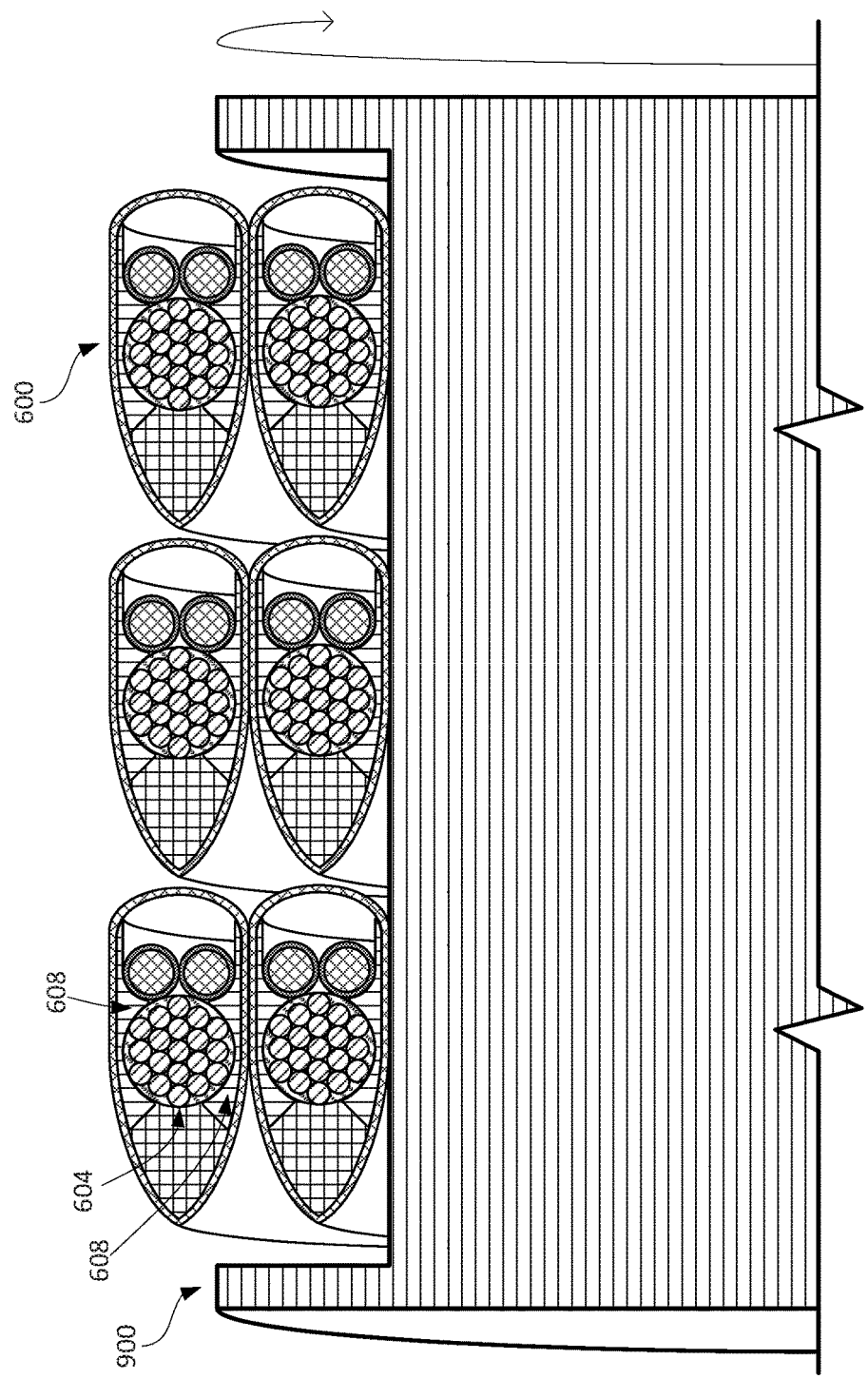
FIG. 10 depicts a section view of a faired tether wrapped in a double layer on a winch drum, according to an example embodiment.

FIG. 10 depicts a section view of a faired tether 600 wrapped in a double layer on a winch drum 900, according to an example embodiment. Winch drum 900 may be the same or similar to winch drum 412. In this arrangement, opposing rigid supports 608 are arranged on both sides of the tether and provide support to the strength core 704 both for wrapping onto the winch drum 900 and for wrapping subsequent layers of tether.

III. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. A tether comprising:
    an outer jacket comprising a compliant material and an exterior surface in the form of an airfoil shape, wherein the airfoil shape comprises a leading edge, a trailing edge, and opposing upper and lower side walls between the leading edge and the trailing edge;
    a strength core arranged longitudinally within the tether;
    a first electrical conductor arranged longitudinally within the tether and located between the strength core and the leading edge; and
    a first rigid support member disposed between the strength core and the lower side wall of the outer jacket, wherein the first rigid support member comprises a rigid material with a hardness greater than a hardness of the compliant material of the outer jacket.

2. The tether of claim 1, wherein the rigid material of the first rigid support member has a shore durometer in a range between about 10 D and about 100 D.

3. The tether of claim 1, wherein the compliant material of the outer jacket has a shore durometer in a range between about 30 A and about 100 A.

4. The tether of claim 1, wherein the first rigid support member further comprises:
    a first mating surface that conforms to a shape of an interior surface along the lower side wall;
        a concave surface configured to inhibit movement of the strength core within the tether along an axis between the leading edge and the trailing edge; and
        an internal support structure configured to inhibit movement of the strength core within the tether in a direction of the lower side wall.

5. The tether of claim 4, wherein the first rigid member is rotatable about the strength core.

6. The tether of claim 4, wherein the internal support structure of the first rigid member comprises a plurality of ribs, wherein each rib of the plurality extends between the first mating surface and the concave surface.

7. The tether of claim 4, wherein the first rigid support member further comprises a protrusion extending along the lower side wall in a direction of the leading edge, wherein the protrusion is located between the first electrical conductor and the lower side wall.

8. The tether of claim 1, further comprising a fill material, wherein the fill material is within the tether and located adjacent to the trailing edge and between the upper and lower side walls, wherein the fill material has a hardness less than the hardness of the rigid material of the first rigid support member.

9. The tether of claim 8, wherein the fill material is additionally located between the strength core and the upper side wall.

10. The tether of claim 9, further comprising a second electrical conductor, wherein the fill material is additionally located between the upper side wall and the second electrical conductor.

11. The tether of claim 1, wherein the fill material has a shore durometer in a range between about 10 OO and about 100 OO.

12. The tether of claim 1, further comprising:
a second rigid support member disposed between the strength core and the upper side wall of the outer jacket, wherein the second rigid support member comprises a second rigid material with a hardness greater than the hardness of the compliant material of the outer jacket.

13. The tether of claim 12, wherein the second rigid material of the second rigid support member has a shore durometer in a range between about 10 D and about 100 D.

14. The tether of claim 12, wherein the second rigid support member is arranged as a mirror image of the first rigid support member.

15. The tether of claim 1, further comprising a cavity in the tether, wherein the cavity is located between the leading edge and the strength member, wherein the first electrical conductor runs through the cavity, and wherein the cavity has a length greater than a diameter of the first electrical conductor in a direction between the leading edge and the trailing edge of the tether.

16. The tether of claim 1, further comprising a second electrical conductor arranged longitudinally within the tether and located between the strength core and the leading edge.

17. A system comprising:
an aerial vehicle;
a winch drum; and
a tether configured to be wound around the winch drum, the tether comprising:
an outer jacket comprising a compliant material and an exterior surface in the form of an airfoil shape, wherein the airfoil shape comprises a leading edge, a trailing edge, and opposing upper and lower side walls between the leading edge and the trailing edge, wherein the system is configured such that the lower side wall contacts the winch drum when the tether is wound around the winch drum;
a strength core arranged longitudinally within the tether;
a first electrical conductor arranged longitudinally within the tether and located between the strength core and the leading edge; and
a first rigid support member disposed between the strength core and the lower side wall of the outer jacket, wherein the first rigid support member comprises a rigid material with a hardness greater than a hardness of the compliant material of the outer jacket, and
wherein the system is configured for the tether to be wrapped around the winch drum in a single layer only.

18. The system of claim 17, wherein the first rigid support member further comprises:
a first mating surface that conforms to a shape of an interior surface along the lower side wall;
a concave surface configured to inhibit movement of the strength core within the tether along an axis between the leading edge and the trailing edge; and
an internal support structure configured to inhibit movement of the strength core within the in the direction of the lower side wall.

19. A system comprising:
an aerial vehicle;
a winch drum; and
a tether configured to be wound around the winch, the tether comprising:
an outer jacket comprising a compliant material and an exterior surface in the form of an airfoil shape, including a leading edge, a trailing edge, and opposing upper and lower side walls between the leading edge and the trailing edge, wherein the system is configured such that the lower side wall contacts the winch drum when the tether is wound around the winch drum in a first layer, and wherein the lower side wall of a second layer contacts the upper side wall of the first layer when the tether is wound around the winch drum in a second layer;
a strength core arranged longitudinally within the tether;
a first electrical conductor arranged longitudinally within the tether and located between the strength core and the leading edge;
a first rigid support member disposed between the strength core and the lower side wall of the outer jacket, wherein the first rigid support member comprises a rigid material with a hardness greater than a hardness of the compliant material of the outer jacket; and
a second rigid support member disposed between the strength core and the upper side wall of the outer jacket, wherein the second rigid support member comprises a second rigid material with a hardness greater than the hardness of the compliant material of the outer jacket.

20. The system of claim 19, wherein the first rigid support member further comprises:
a first mating surface that conforms to a shape of an interior surface along the lower side wall;
a concave surface configured to inhibit movement of the strength core within the tether along an axis between the leading edge and the trailing edge; and
an internal support structure configured to inhibit movement of the strength core within the tether in the direction of the lower side wall, and
wherein the second rigid support member is arranged as a mirror image of the first rigid support member.

* * * * *